United States Patent Office 3,016,396
Patented Jan. 9, 1962

3,016,396
METHOD OF PRODUCING ALUMINUM TRIETHYL
Tsuneo Irie, Tsutomu Kagiya, and Mamoru Asada, Niihama-shi, Japan, assignors to Sumitoma Chemical Company, Ltd., Higashiku, Japan, a corporation of Japan
Filed Apr. 2, 1958, Ser. No. 725,881
Claims priority, application Japan Apr. 3, 1957
6 Claims. (Cl. 260—448)

This invention relates to a method of producting aluminum triethyl from metallic aluminum, ethylene and hydrogen in one direct step continuously and at a favorable yield.

Aluminum triethyl is so unstable that no industrially advantageous method of producing it has been discovered. There has been suggested a method incuding the following reactions and said to be economical (Angew. Chem. 67, 924, 1955):

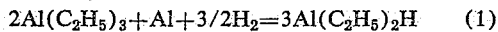
$$2Al(C_2H_5)_3 + Al + 3/2H_2 = 3Al(C_2H_5)_2H \qquad (1)$$

$$3Al(C_2H_5)_2H + 3C_2H_4 = 3Al(C_2H_5)_3 \qquad (2)$$

That is to say, in the reaction represented by the Formula 1, is synthesized by reacting aluminum triethyl with fine aluminum powder and hydrogen under the pressure of hydrogen of 100 to 200 atmospheres and at the reaction temperature of 100 to 120° C. Then, if this synthesized solution is cooled and is kept at 60 to 80° C. and the pressure of ethylene is kept at 4 to 5 atmospheres, the ethylene addition reaction represented by the Formula 2 will take place. If the reaction represented by the Formula 2 is caused at 100 to 120° C., an undesirable ethylene polymerizing reaction represented by the Formula 3 will take place:

$$Al(C_2H_5)_3 + n(C_2H_4) = Al(C_2H_4)_n(C_2H_5)_3 \qquad (3)$$

British Patent No. 770,707 on the production of aluminum trialkyls indicates that ethylene is most likely to react with aluminum trialkyls among olefines. Therefore, when added to the produced aluminum triethyl, ethylene will produce higher aluminum alkyls. It is not easy to directly produce aluminum triethyl at a favorable yield. The olefinic reactant is α-olefin and, the product contains a large amount of aluminum dialkyl hydride.

As a result of detailed research on each of the reactions represented by the above Formulas 1, 2 and 3, we have now succeeded in direct synthesis in one step. When aluminum, ethylene and hydrogen are reacted with aluminum triethyl, diethyl aluminum hydride will be first produced from aluminum triethyl, aluminum and hydrogen. As long as hydrogen and ethylene co-exist, said hydride will react with ethylene and will change to aluminum triethyl without causing the polymerizing reaction of ethylene in Formula 3.

One of the objects of the present invention is to provide a critical condition in the case of increasing aluminum triethyl by reacting metallic aluminum, ethylene and hydrogen with aluminum triethyl.

Another object of the present invention is to provide an apparatus for continuously producing aluminum triethyl in one step.

FIG. 1 of the drawings shows the critical relation between the partial pressure of ethylene and the reaction temperature at each of the total pressures of 250, 150, 100 and 50 atmospheres.

According to the present invention, fine activated aluminum powder and aluminum triethyl are first put into an autoclave in the presence of hydrogen and then, while the temperature therein is kept at 50 to 250° C., hydrogen and ethylene or a mixed gas of ethylene and hydrogen is fed into the autoclave so that the total pressure in the autoclave is kept at 50 to 300 atmospheres. Thus the reaction will proceed at 50 to 250° C. under 50 to 300 atmospheres. After the unreacted gas is discharged, the aluminum triethyl solution produced in the autoclave is taken out of the system and is separated by distillation under a reduced pressure.

The present method can be carried out by batch, semi-continuous and continuous systems. In the present invention, the produced aluminum triethyl itself will become an accelerator of the subsequent reaction and, as long as metallic aluminum, hydrogen and ethylene are present, the reaction will autocatalytically continue.

The metallic alluminum to be used in the method of the present invention should be fine powder having no oxidized film on the surface thereof and consisting of aluminum particles of a relatively high purity pulverized to several microns. It is preferable to carry out said pulverization in a hydrogen atmosphere. During the pulverization, several percent by weight of such solid fatty acids as palmitic acid or stearic acid may be added to aluminum.

The fine powder of metallic aluminum alone or as mixed with aluminum triethyl is fed to the autoclave. The ratio by weight of aluminum to aluminum triethyl when they are to be fed as a mixture should be about 2:1 or less in order to give the mixture an adequate viscosity for transportation in a pipe.

The hydrogen should be pure. For example, hydrogen obtained by electrolyzing water is deoxygenized by being treated in the presence of palladium catalyst. The ethylene to be used is produced by a conventional method such as, for example, by dehydrating ethyl alcohol with activated alumina or treating it in a high pressure rectifying column.

It is convenient to separately feed ethylene and hydrogen, but it is preferable to use a gaseous mixture of ethylene and hydrogen in a ratio of about 2:1 by volume, as the ratio of gasses spent in reaction is 2:1. The compressing power will be thereby saved more than by separately feeding them.

Figure 1:
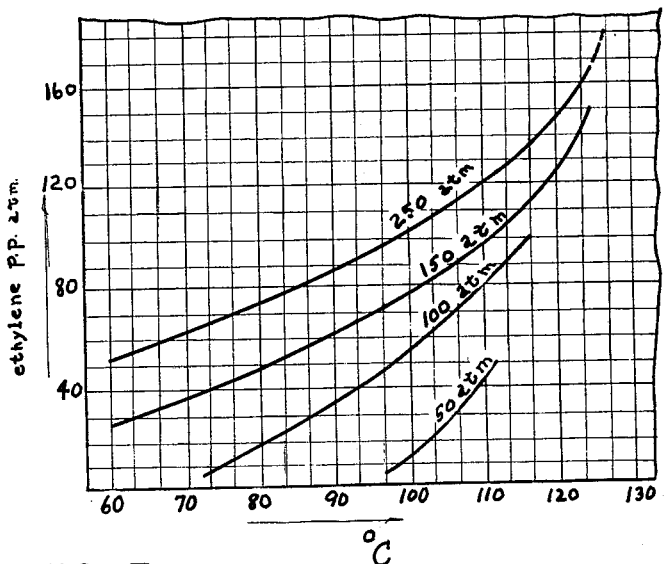

Generally speaking, in the method of the present invention, the reaction temperature should preferably be within the range of 50 to 250° C. Below 50° C., the reaction velocity will be too low to be industrially advantageous. At temperatures above 250° C., the decomposition of aluminum triethyl will be too much. The reaction pressure is proper at 50 to 300 atmospheres. Below 50 atmospheres, the reaction velocity will be too low to be industrially acceptable. A reaction pressure below 300 atmospheres is satisfactory. However, there is a critical condition in carrying out the method of the present invention. That is to say, there is a limit at which the increase of aluminum triethyl stops. Such curves as are shown in FIG. 1 will result when the reaction temperature in ° C. are plotted on the abscissa and the partial pressures in atmospheres of ethylene in the gas are plotted on the ordinate. The field on the lower and right side of each curve corresponding to the specified total pressure is a condition necessary for the reaction of the present invention to proceed. It is found that, in the field on the upper left side of each curve, aluminum triethyl will not increase but will rather decrease. Under the conditions on the upper left side of each curve or on the high ethylene partial pressure side, the reaction product will be viscous and the greater part of the aluminum will remain unreacted. The fact that, when the reaction product after aluminum triethyl is removed is decomposed with alcohol, various polymerization products ranging from butane and hexane to solid paraffine will be obtained shows that, before the starting aluminum triethyl turns into diethyl aluminum hydride, the ethylene will cause an additional reaction due to telomerization. On the critical curve, the reaction rate of the aluminum triethyl multiplying reaction and that of the ethylene addition reaction will be balanced with each other. It is therefore preferable to select the polymerizing condition from the part deviating towards right from said critical curve.

Figure 3:
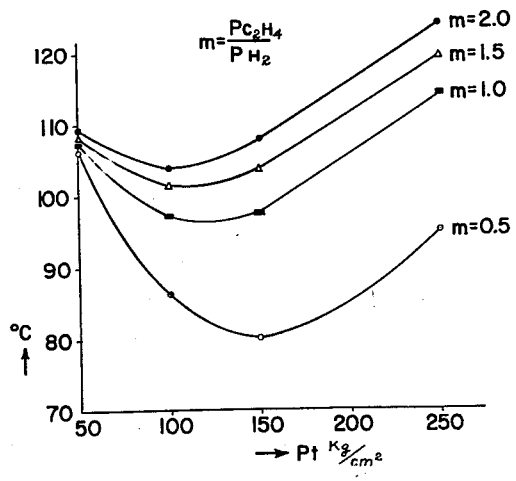
FIG. 3 shows a relation between total pressure of ethylene and hydrogen gases and temperature.

The above mentioned situation will easily be understood from FIG. 3, in which points on the critical curves are replotted according to ratio of partial pressures of ethylene and hydrogen. Conditions necessary for the present aluminum triethyl production will be within the upper fields above these curves. According to the present invention, the higher the reaction temperature is, the more the amount of production of aluminum triethyl can be expected.

Figure 2:
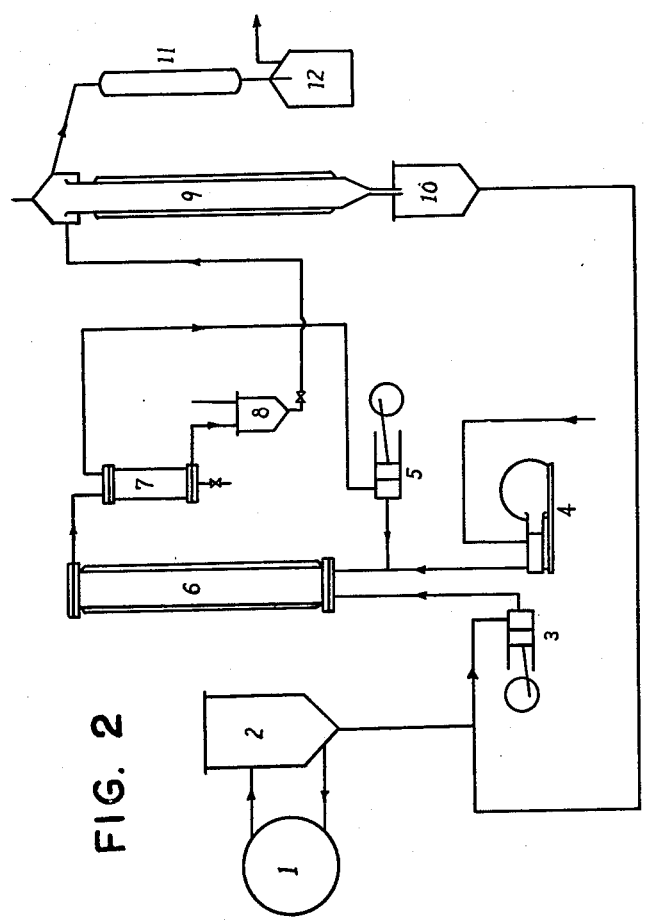
FIG. 2 is a schematic view of the apparatus best adapted to carry out the present process.

A specific continuous operation of the present invention shall be described with reference to FIG. 2. A mixture wherein the ratio by weight of aluminum powder to aluminum triethyl is 2:1 or less is pulverized by means of a wet micropulverizer 1 and is stored in a storage tank 2. This mixed solution of aluminum and aluminum triethyl is sent into a synthesis tower 6 by means of a plunger pump. The synthesized solution coming out of the synthesis tower 6 will now enter a gas-liquid separator 7 to have the unreacted gas separated. The gas is returned to the synthesis tower 6 by means of a circulating pump 5. The liquid separated in the separator 7 is once stored in a storage means 8. In an evaporator 9, the synthesized solution sent from the storage means 8 is evaporated under the conditions of 100 to 130° C. and a reduced pressure of about 10 mm. Hg. The refined aluminum triethyl is cooled in a cooler 11 and is stored in a storage 12. The still residue is returned as required to the synthesis tower 6 through a storage means 10 by means of a plunger pump 3.

The following examples are to explain the present invention more particularly but without limitation.

EXAMPLE 1

A shaking type autoclave of a capacity of 1 liter was charged with 300 g. of aluminum triethyl and 100 g. of fine aluminum powder pulverized in a hydrogen atmosphere for more than 12 hours and having no oxidized film on the surface. A mixed gas of ethylene and hydrogen at a mol ratio of 2:1 was, while being fed into the autoclave, reacted with the contents therein under the conditions of a total pressure of 250 atmospheres (the partial pressure of ethylene being 167 atmospheres) and 140° C. Then, during the first 30 seconds or so, due to the physical dissolution of the mixed gas, the pressure dropped a little. However, while the autoclave was being shaken, the reaction proceeded and the pressure began to drop. Therefore, the mixed gas was recruited and was kept at 250 atmospheres. After the reaction was carried out for about 2 hours, the synthesized solution was cooled down to room temperature and was taken out. When the solution was distilled at 90 to 100° C. under a reduced pressure of about 10 mm. Hg (the boiling point being 94° C. under 10 mm. Hg), aluminum triethyl in an amount 333 g. more than in the first charge was obtained.

On the other hand, hydrogen under 77.5 atmospheres was fed in advance. The mixed gas under 172.5 atmospheres was added thereto to make the partial pressure of ethylene 115 atmospheres. They were reacted at 110° C. for 2.5 hours. When the reaction product was then taken out, no increase of aluminum triethyl was seen.

Further, when the reaction was carried out by the same method as in the above under the partial pressure of ethylene of 80 atmospheres and 80° C. for 3 hours, the obtained aluminum triethyl was less by 40 g. than the charged amount.

Such results were seen even in experiments carried out under the total pressures of 150, 100 and 50 atmospheres, respectively.

The results of tests to find the relations between the partial pressure of ethylene and the reaction temperature influencing the amount of increase of aluminum triethyl under a constant total pressure are exemplified as follows:

An autoclave was charged with 300 g. of aluminum triethyl and 100 g. of aluminum powder in the same manner as was described above. Hydrogen was fed under 40 atmospheres in advance after the initial pressure drop ceased. When a mixed gas of ethylene and hydrogen at a mol ratio of 2:1 was then compressed and was reacted with them under the constant condition of a total pressure of 250 atmospheres (the partial pressure of ethylene being 140 atmospheres), the amounts of increase of aluminum triethyl at the respective temperatures were as shown in Table 1.

Table 1.—Amounts of increase under the total pressure of 250 atmospheres

| Temperatures in ° C. | 60 | 110 | 120 | 130 | 140 | 160 | 200 |
|---|---|---|---|---|---|---|---|
| Reaction time in hours | 3.0 | 3.0 | 2.5 | 2.5 | 2.0 | 0.83 | 0.3 |
| Amounts of increase in grams | −93 | −33 | −26 | +47 | +295 | +292 | +290 |

In the case that the partial pressure of ethylene was varied by varying the pressure of the hydrogen fed first under the total pressure of 250 atmospheres, the amounts of increased aluminum triethyl at various reaction temperatures and under various partial pressures of ethylene were as shown in Table 2.

Table 2.—Amounts of increase under the total pressure of 250 atmospheres

| Temperatures in ° C. | 60 | 80 | 80 | 100 | 100 | 120 | 140 |
|---|---|---|---|---|---|---|---|
| Partial pressures of ethylene in atmospheres | 60 | 80 | 60 | 100 | 80 | 100 | 140 |
| Amounts of increase in grams | −6 | −40 | +262 | −9 | +251 | +217 | +288 |

Further, when the total pressure was 150 atmospheres and the reaction temperature and the partial pressure of ethylene were varied in exactly the same manner as was described above, such results as are shown in Table 3 were obtained.

Table 3.—Amounts of increase under the total pressure of 150 atmospheres

| Temperatures in ° C. | 60 | 70 | 80 | 100 | 120 | 140 |
|---|---|---|---|---|---|---|
| Partial pressures of ethylene in atmospheres | 32 | 46 | 51 | 74 | 100 | 100 |
| Amounts of increase in grams | −5 | −18 | −26 | +301 | +50 | +333 |

In case the total pressures were 100 and 50 atmospheres and the reaction temperature and the partial pressure of ethylene were varied, such results as are shown in Tables 4 and 5, respectively, were obtained.

Table 4.—*Amounts of increase under the total pressure of 100 atmospheres*

| Temperatures in ° C | 80 | 80 | 90 | 90 | 100 |
|---|---|---|---|---|---|
| Partial pressures of ethylene in atmospheres | 21 | 10 | 36 | 38 | 42 |
| Amounts of increase in grams | −2 | +151 | −6 | −77 | +214 |

Table 5.—*Amounts of increase under the total pressure of 50 atmospheres*

| Temperatures in ° C | 90 | 110 | 115 | 120 | 130 |
|---|---|---|---|---|---|
| Partial pressures of ethylene in atmospheres | 30 | 24 | 33.3 | 24 | 24 |
| Amounts of increase in grams | −40 | +271 | +192 | +303 | +284 |

EXAMPLE 2

The raw material ethylene to be used was prepared by dehydrating ethyl alcohol with active alumina and was rectified in a high pressure fractionating column. The hydrogen to be used was prepared by the electrolysis of water and was deoxygenized with palladium catalyst. The aluminum to be used was prepared by crushing high purity aluminum particles in advance by means of a crusher so as to pass through about a 300 mesh screen and was further crushed for more than 12 hours in a hydrogen atmosphere within a ball mill with the addition of 1% by weight of stearic acid to aluminum so as to be of a mean particle diameter of 5µ.

An autoclave of a capacity of 1 liter was charged with 300 g. of aluminum triethyl and then with 100 g. of said metallic aluminum powder. The reaction temperature was 140° C. While the autoclave was being shaken, hydrogen was put into it to 40 atmospheres. A gaseous mixture of ethylene and hydrogen at a ratio by volume (or mol) of 2:1 (which shall be known as the make-up gas hereinafter) was fed into the autoclave to make the total pressure 250 atmospheres. When the autoclave was shaken, for the first 30 seconds or so, due to the physical dissolution of the gas to the liquid phase, the pressure dropped a little. While the autoclave was being continuously shaken, the reaction soon proceeded and the pressure began to drop. Therefore, the total pressure was kept at 250 atmospheres with supplement of the make-up gas. After the reaction was continued for about 2 hours and the gas was purged, the autoclave was cooled down to the room temperature. When the synthesized liquid was taken out and was vacuum-distilled at 90 to 100° C. under about 10 mm. Hg, aluminum triethyl in an amount larger by 295 g. than the first charged amount was obtained.

EXAMPLE 3

Exactly the same as in Example 2, the reaction temperature was made 60° C., the pressure of hydrogen to be compressed in advance was made 190 atmospheres and the total pressure was made 250 atmospheres by the make-up gas. When the experiment was stopped after about 20 hours, aluminum triethyl in an amount larger by 71 g. than the first charged amount was obtained by distillation.

EXAMPLE 4

The same as in Example 2, the reaction temperature was made 100° C., hydrogen was compressed to 130 atmospheres in advance and the total pressure was made 250 atmospheres by the make-up gas. When the reaction was finished in about 2 hours, aluminum triethyl in an amount larger by 252 g. than the charged amount was obtained by distillation.

EXAMPLE 5

In the same reaction as in Example 2, the reaction temperature was in 100° C., hydrogen was compressed into 120 atmospheres in advance and the total pressure was then made 300 atmospheres by the make-up gas. Then, after about 1.5 hours, aluminum triethyl increased by about 125 g. as compared with the first charged amount.

EXAMPLE 6

The same as in Example 2, the reaction temperature was 200° C. and the make-up gas was compressed to 250 atmospheres without supplying hydrogen in advance. When the reaction was carried out for about 0.3 hour, aluminium triethyl increased by about 280 g. as compared with the first charged amount.

EXAMPLE 7

In the same reaction as in Example 2, the reaction temperature was 110° C., hydrogen was supplied at 14 atmospheres in advance and the total pressure was made 50 atmospheres by the make-up gas. Then, after about 28 hours, aluminum triethyl increased by about 271 g. as compared with the first charged amount.

EXAMPLE 8

The same as in Example 2, the reaction temperature was 100° C., hydrogen was supplied at 39 atmospheres in advance and the total pressure was made 150 atmospheres by the make-up gas. When the reaction was thus carried out for about 10.3 hours, aluminum triethyl increased by about 301 g. as compared with the first charged amount.

EXAMPLE 9

When the reaction in accordance with Example 2 was carried out by making the reaction temperature 120° C. and making the pressure 150 atmospheres with the make-up gas without supplying hydrogen in advance, after about 2 hours aluminum triethyl increased by about 50 g.

EXAMPLE 10

When the reaction was carried out in accordance with Example 2 by making the reaction temperature 140° C. and making the pressure 150 atmospheres with the make-up gas without supplying hydrogen in advance, after about 2.5 hours aluminum triethyl increased by about 332 g.

EXAMPLE 11

When the reaction was carried out in accordance with Example 2 by making the reaction temperature 80° C., supplying hydrogen at 85 atmospheres in advance and then making the total pressure 100 atmospheres with the make-up gas, after about 40 hours aluminum triethyl increased by about 151 g.

EXAMPLE 12

When the reaction was carried out in accordance with Example 2 by making the reaction temperature 100° C., supplying hydrogen at 37 atmospheres in advance and then making the total pressure 100 atmospheres with the make-up gas, aluminum triethyl increased by about 214 g.

EXAMPLE 13

When the reaction was carried out for about 15 hours in accordance with Example 2 by making the reaction temperature 115° C. and making the total pressure 50 atmospheres with the make-up gas without supplying hydrogen in advance, aluminum triethyl increased by about 200 g.

EXAMPLE 14

In the same manner as in Example 2, a shaking type autoclave of a capacity of about 2 liters having a port for feeding aluminum triethyl and hydrogen or the mixture of hydrogen and ethylene and an outlet pipe for extracting the product liquid, the forward end of said pipe being at a level of about 5 cm. from the bottom so that about 300 cc. of the product liquid might remain after the extraction, was charged with 300 g. of aluminum triethyl and 300 g. of activated aluminum powder. While the total pressure was constantly kept at 250 atmospheres with the addition of the make-up gas, the reaction was carried out at 140° C. for 3 hours. The shaking was then stopped. The remaining aluminum powder was allowed to settle. Then, when the valve of the outlet pipe was opend, the product solution in the autoclave was pushed out by the pressure of the gas. When the level of the remaining product solution fell down to that of the forward end of the extracting pipe, no more liquid came out and only the gas began to come out. Therefore, the valve was again closed. Thus the same as in the first, while the autoclave was being shaken, the mixed gas was fed so that the total pressure might be kept at 250 atmospheres. The reaction was carried on for 3 hours. Thereafter, by the same operation as in the previous time, the product liquid was taken out. The reaction could be repeated and continued so long as aluminum remained. When the product liquid taken out in the two reactions was distilled the same as in Example 2, about 1.35 kg. of aluminum triethyl were obtained.

EXAMPLE 15

An upright reactor having a diameter of 4.4 cm., a length of 4 m. and a capacity of about 6 liters was kept at 140° C. in advance. A mixture of activated aluminum the same as was used in Example 2 and aluminum triethyl at a ratio by weight of 1:3 was fed into the reactor from the lower end at a rate of 1 liter/hour. At the same time, a mixed gas of ethylene and hydrogen at a mol ratio of 2:1 under 250 atmospheres was fed continuously at a rate of 0.8 to 1.0 cubic meter/hour by means of a compressor. The aluminum powder, aluminum triethyl, hydrogen and ethylene thus fed into the reactor were gradually pushed up toward the top while reacting. When they reached the top, about 90% of the activated aluminum had been consumed in the reaction. The liquid substance in such state accompanied by the unreacted gas was transferred to a gas-liquid separator. The gas separated here was returned to the reaction by means of a circulator. On the other hand, the liquid substance was passed through a pressure reducing valve, was once stored in a storage tank and was sent to a distilling tower in which aluminum triethyl was separated under the conditions of 10 or more mm. Hg and 100 to 130° C. The liquid then remaining in the tower was added to the mixed solution of activated aluminum and aluminum triethyl to be fed to the reactor by means of a plunger pump and was returned to the reactor. Thus the reaction was carried out for about 30 hours. It was possible by such method to produce aluminum triethyl at a rate of 1.7 kg./hour.

What is claimed is:
1. A method of producing aluminum triethyl which comprises preparing an activated aluminum by dry milling an aluminum powder in hydrogen atmosphere with a solid fatty acid compound in a weight ratio of several percent based upon the aluminum powder, and reacting the activated aluminum, hydrogen and ethylene in the presence of aluminum triethyl at a temperature of from 50° to 250° C. under a pressure of from 50 to 300 atmospheres and below the fixed critical partial pressure of the ethylene.

2. A method of producing aluminum triethyl which comprises, continuously introducing a mixture of hydrogen and ethylene and a mixture of aluminum triethyl and an activated aluminum prepared by milling an aluminum powder with several percent based on the weight of the aluminum powder of a solid fatty acid compound in a hydrogen atmosphere, into the bottom of a reaction zone, reacting the mixtures under a pressure of from 50 to 300 atmospheres and below the fixed critical partial pressure of ethylene and at a temperature of from 50° to 250° C., continuously removing the resultant mixture from the top of the reaction zone, separating gas from said resultant mixture, recycling the separated gas together with additional hydrogen and ethylene to the reaction zone, distilling aluminum triethyl from the mixture remaining after the gas separation, recycling the residue from the distillation to the reaction zone, and condensing and recovering the distilled aluminum triethyl.

3. The method according to claim 1 wherein the reaction is performed in the presence of the activated aluminum and aluminum triethyl in excess of the theoretical value based on the hydrogen and ethylene present.

4. The method according to claim 1 wherein said activated aluminum is prepared by milling in the presence of aluminum triethyl.

5. The method according to claim 1 wherein an aluminum powder is milled to about 5 microns average particle diameter.

6. The method according to claim 5 wherein the solid fatty acid compound is selected from the group consisting of stearic acid and palmitic acid.

References Cited in the file of this patent
UNITED STATES PATENTS

| | | |
|---|---|---|
| 2,508,884 | Hereng | Mar. 23, 1950 |
| 2,702,741 | Robertson | Feb. 22, 1955 |
| 2,787,626 | Redman | Apr. 2, 1957 |
| 2,900,402 | Johnson | Aug. 18, 1959 |